United States Patent
Wang et al.

(10) Patent No.: US 11,949,868 B2
(45) Date of Patent: Apr. 2, 2024

(54) METHOD AND DEVICE FOR SELECTING CONTEXT MODEL OF QUANTIZATION COEFFICIENT END FLAG BIT

(71) Applicant: PEKING UNIVERSITY SHENZHEN GRADUATE SCHOOL, Shenzhen (CN)

(72) Inventors: Ronggang Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 459 days.

(21) Appl. No.: 17/422,297

(22) PCT Filed: Mar. 7, 2019

(86) PCT No.: PCT/CN2019/077278
§ 371 (c)(1),
(2) Date: Jul. 12, 2021

(87) PCT Pub. No.: WO2020/172907
PCT Pub. Date: Sep. 3, 2020

(65) Prior Publication Data
US 2022/0078425 A1    Mar. 10, 2022

(30) Foreign Application Priority Data
Feb. 27, 2019    (CN) .......................... 201910145192.8

(51) Int. Cl.
*H04N 7/12*      (2006.01)
*H04N 19/105*    (2014.01)
(Continued)

(52) U.S. Cl.
CPC ......... *H04N 19/124* (2014.11); *H04N 19/105* (2014.11); *H04N 19/129* (2014.11);
(Continued)

(58) Field of Classification Search
CPC .................................................... H04N 19/124
See application file for complete search history.

(56) References Cited

U.S. PATENT DOCUMENTS

2012/0163448 A1    6/2012    Zheng et al.

FOREIGN PATENT DOCUMENTS

| CN | 1980395 A | 6/2007 |
|----|-----------|--------|
| CN | 107087188 A | 8/2017 |

OTHER PUBLICATIONS

Gao, Min et al. "AVS2 (Optimizations for the entropy coding module in AVS2)" (Intelligent Computer and Applications), vol. 7, No. 2, Apr. 28, 2017 (Apr. 28, 2017), ISSN: 2095-2163.

*Primary Examiner* — Young Lee

(57) ABSTRACT

Embodiments of the present disclosure provide a method and device for selecting a context model of a quantized coefficient end flag. The method comprises: obtaining a scanning position POS of a non-zero coefficient corresponding to current quantized coefficient end flag in a specific scanning order; wherein the scanning position POS is a subscript of the non-zero coefficient in the scanning order; configuring a first context model array, and using a fixed value as the base to calculate the logarithmic value of the value of the scanning position POS plus 1, and according to the logarithmic value, selecting a first context model from the first context model array; and using the first context model to encode or decode a binary symbol of the current quantized coefficient end flag. According to the technical solution of the present application, it is able to improve encoding and decoding efficiency for a quantized coefficient (Continued)

end flag, thereby further improve the efficiency of video encoding and decoding.

13 Claims, 3 Drawing Sheets

(51) Int. Cl.
*H04N 19/124* (2014.01)
*H04N 19/129* (2014.01)
*H04N 19/176* (2014.01)
*H04N 19/61* (2014.01)
*H04N 19/80* (2014.01)
*H04N 19/86* (2014.01)

(52) U.S. Cl.
CPC ........... *H04N 19/176* (2014.11); *H04N 19/61* (2014.11); *H04N 19/80* (2014.11); *H04N 19/86* (2014.11)

METHOD AND DEVICE FOR SELECTING CONTEXT MODEL OF QUANTIZATION COEFFICIENT END FLAG BIT

CROSS-REFERENCE To RELATED APPLICATIONS

The present application is a national stage filing under 35 U.S.C. § 371 of PCT/CN2019/077278, filed on Mar. 7, 2019 which claims priority to Chinese Application No. 201910145192.8, filed on Feb. 27, 2019. The applications are incorporated herein by reference in their entirety.

FIELD

The present disclosure relates to a field of video encoding and decoding, specifically relates to a method and device for selecting a context model of a quantized coefficient end flag.

BACKGROUND

In the process of video encoding or decoding, when encoding or decoding a quantized block, scanning position is initialized, and the quantized block is scanned according to a predetermined scanning order. According to arithmetic encoding or decoding in the scanning order, one or more sets of Run-Level pairs are sequentially encoded or decoded; wherein, Run represents the number of consecutive zero coefficients starting from current scanning position, and Level represents the value of the next non-zero coefficient. After encoding or decoding a set of Run-Level pairs, it is necessary to encode or decode a quantized coefficient end flag through arithmetic encoding or decoding, so as to indicate whether there are non-zero coefficients that have not been encoded or decoded in current quantized coefficient block.

In addition, a unit that identifies a piece of certain decoding information is called a syntax element, and the syntax element may be 0 or 1, or a value greater than 1. When decoding a certain syntax element, the value of the syntax element is binarized into a binary symbol string according to Rules agreed by codec standard, and each symbol in the binary symbol string may be 0 or 1.

In the process of arithmetic encoding or decoding, there needs to determine a context model for each binary symbol in the binary symbol string, which includes a binary symbol of the quantized coefficient end flag. The context model records the probability of occurrence of binary symbols 0 or 1. In different situations, the probability of occurrence of binary symbols 0 or 1 is quite different (for example: binary symbols of different syntax elements, different binary symbol bit of the same syntax element, etc.). Therefore, different binary symbols should use different context models. However, in the prior art, the same context model is used for encoding or decoding binary symbols of different quantized coefficient end flags, which reduces the encoding and decoding efficiency of the quantized coefficient end flags, and further reduces the efficiency of video encoding and decoding.

SUMMARY

In view of the above-mentioned facts, the purpose of the present invention is to provide a method and device for selecting a context model of a quantized coefficient end flag, so as to solve the problem of reducing the encoding and decoding efficiency of the quantized coefficient end flags and further reducing the efficiency of video encoding and decoding because of using the same context model to encode and decode all binary symbols in the prior art.

In order to solve the above technical problems, the embodiments of the specification are implemented as follows:

A method for selecting a context model of a quantized coefficient end flag provided in some embodiments of the specification, includes:

Obtaining a scanning position POS of a non-zero coefficient corresponding to current quantized coefficient end flag in a specific scanning order; wherein the scanning position POS is a subscript of the non-zero coefficient in the scanning order;

Configuring a first context model array, and using a fixed value as the base to calculate the logarithmic value of the value of the scanning position POS plus 1, and according to the logarithmic value, selecting a first context model from the first context model array; and using the first context model to encode or decode a binary symbol of the current quantized coefficient end flag.

Optionally, the scanning order is a zigzag scanning order.

Optionally, the fixed value is an integer greater than one.

Optionally, the step of selecting a first context model from the first context model array, comprises: rounding down the logarithmic value to obtain an index value, and selecting a first context model whose subscript is equal to the index value from the first context model array according to the index value.

Optionally, the method further comprises: selecting a second context model, and generating a third context model according to the first context model and the second context model, wherein the third context model is used to encode or decode the binary symbol of the current quantized coefficient end flag.

Optionally, the step of selecting a second context model, comprises:

configuring a second context model array with an arbitrary length, and presetting a variable and a default value;

if current non-zero coefficient is the first non-zero coefficient in the scanning order, the value of the variable is equal to the default value;

if current non-zero coefficient is a non-zero coefficient after the first non-zero coefficient in the scanning order, the value of the variable is equal to the value of the previous non-zero coefficient of the current non-zero coefficient in the scanning order;

Correcting the value of the variable to the length value of the second context model array if the value of the variable is greater than the length value of the second context model array;

Subtracting 1 from the value of the variable to get an index value, and selecting a second context model whose subscript is equal to the index value from the second context model array according to the index value.

Optionally, the method further comprises:

Denoting the more probable symbol of the first context model, the more probable symbol of the second context model and the more probable symbol of the third context model as mps1, mps2 and mps3, respectively;

Denoting the negative logarithm value of mps1, the negative logarithm value of mps2 and the negative logarithm value of mps3 as lgPmps1, lgPmps2 and lgPmps3, respectively.

Optionally, the step of generating a third context model according to the first context model and the second context model, comprises:

When mps1 and mps2 are the same, then mps3 is equal to mps1, in this situation, $$lgPmps3=(lgPmps1+1lgPmps2)\gg1;$$

When mps1 and mps2 are different, and lgPmps1 is less than lgPmps2, then mps3 is equal to mps1, in this situation, $$lgPmps3=(1023-((lgPmps2-lgPmps1)\gg1));$$

When mps1 and mps2 are different, and lgPmps1 is greater than lgPmps2, then mps3 is equal to mps2, in this situation, $$lgPmps3=(1023-((lgPmps1-lgPmps2)\gg1)).$$

A video encoding method provided by embodiments of the specification, comprises:

Obtaining a predicted image block through prediction technologies according to prediction information;

Transform units subtracts the predicted image block from a corresponding original image block to obtain a first residual image block;

The first residual image block is transformed and quantized to obtain a quantized block;

Writing division information, the prediction information and the quantized block into a bitstream;

Performing inverse quantization and inverse transformation on the quantized block to obtain a second residual image block;

Generating a reconstructed image block based on the second residual image block and the predicted image block;

Performing deblocking filtering on the reconstructed image formed by reconstructed image blocks to obtain a reference image for reference in subsequent frames;

The video encoding method further comprises, in the process of writing the quantized block into the bitstream during video encoding, the above method is used to select a context model of a quantized coefficient end flag in the quantized block.

A video decoding method provided by embodiments of the specification, comprises:

Decoding division information, prediction information and quantized blocks from a bitstream;

Obtaining a predicted image block through prediction technologies according to the prediction information;

Performing inverse quantization and inverse transformation on the quantized block to obtain a residual image block;

Adding the residual image block to the corresponding predicted image block to obtain a reconstructed image block;

Performing deblocking filtering on the reconstructed image formed by reconstructed image blocks to obtain a reference image for reference in subsequent frames;

The video decoding method further comprises, in the process of decoding the quantized block from the bitstream during video decoding, the above method is used to select a context model of a quantized coefficient end flag in the quantized block.

An apparatus for selecting a context model of a quantized coefficient end flag provided by embodiments of the specification, comprises:

Obtaining module, for obtaining a scanning position POS of a non-zero coefficient corresponding to current quantized coefficient end flag in a specific scanning order; wherein the scanning position POS is a subscript of the non-zero coefficient in the scanning order;

Selecting module, for configuring a first context model array, and using a fixed value as the base to calculate the logarithmic value of the value of the scanning position POS plus 1, and according to the logarithmic value, selecting a first context model from the first context model array; using the first context model as the context model for encoding or decoding a binary symbol of the current quantized coefficient end flag.

Optionally, further comprises: generating module, for selecting a second context model, and generating a third context model according to the first context model and the second context model, wherein the third context model is used to encode or decode the binary symbol of the current quantized coefficient end flag.

An electronic device provided by embodiments of the specification, comprises a memory, a processor, and a computer program stored on the memory and capable of running on the processor, wherein, the computer program can be executed by the processor to perform the method for selecting a context model of a quantized coefficient end flag.

At least one of the above technical solutions adopted in the embodiments of the specification can achieve the following beneficial effects:

In the present application, it includes the following steps: obtaining a scanning position POS of a non-zero coefficient corresponding to current quantized coefficient end flag in a specific scanning order; wherein the scanning position POS is a subscript of the non-zero coefficient in the scanning order; configuring a first context model array, and using a fixed value as the base to calculate the logarithmic value of the value of the scanning position POS plus 1, and according to the logarithmic value, selecting a first context model from the first context model array; and using the first context model to encode or decode a binary symbol of the current quantized coefficient end flag. According to the technical solution of the present application, it is able to improve encoding and decoding efficiency for a quantized coefficient end flag, thereby further improve the efficiency of video encoding and decoding.

BRIEF DESCRIPTION OF THE DRAWINGS

In order to more clearly illustrate the embodiments of the specification or the technical solutions in the prior art, the drawings used in the embodiments or the prior art description will be briefly introduced below, and obviously, the drawings in the following description are only some of the embodiments described in the specification, and those skilled in the art may obtain other drawings according to these drawings without any creative work.

DETAILED DESCRIPTION OF EMBODIMENTS

In order to enable the skilled in the art to better understand the technical solutions in the specification, the technical solutions in the embodiments of the specification will be clearly and completely described below with reference to the figures of the embodiments of the specification, and obviously, the described embodiments are only parts of the embodiments of the present application, but not all. All other embodiments obtained by the skilled in the art based on the embodiments of the specification without any creative work shall fall within the scope of the present application.

Figure 1:
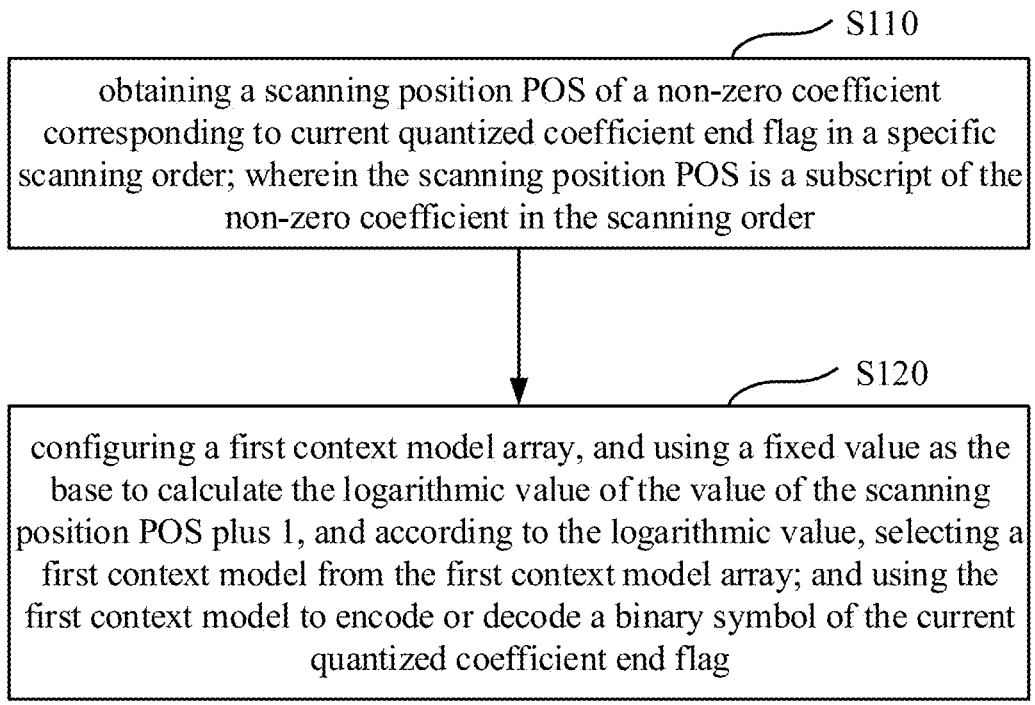
FIG. 1 is a schematic flowchart of a method for selecting a context model of a quantized coefficient end flag provided by an embodiment of the present invention.

FIG. 1 is a schematic flowchart of a method for selecting a context model of a quantized coefficient end flag provided by an embodiment of the present invention. The method may specifically include the following steps:

In step S110, obtaining a scanning position POS of a non-zero coefficient corresponding to current quantized coefficient end flag in a specific scanning order; wherein the scanning position POS is a subscript of the non-zero coefficient in the scanning order.

Figure 2:
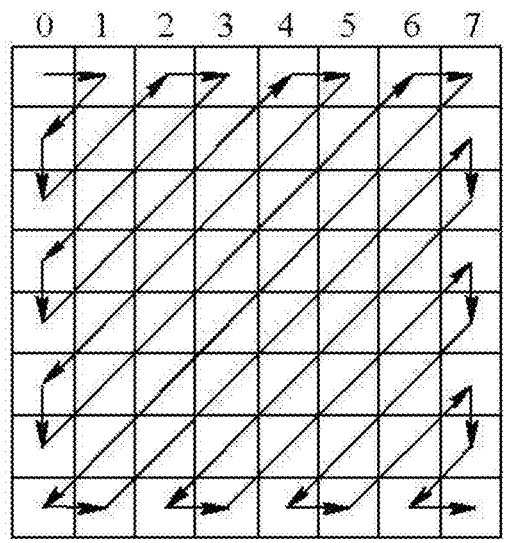
FIG. 2 is a schematic diagram of the scanning order of a typical 8×8 quantized coefficient block using a zigzag scanning mode according to an embodiment of the specification.

In some embodiments of the specification, in the process of video encoding or decoding, when encoding or decoding a quantized block, firstly, a two-dimensional quantized block may be converted into a one-dimensional array according to a certain scanning method, and then the one-dimensional array may be encoded or decoded. In some specific implementation process, a scanning order of the quantized coefficients in the quantized block may be determined according to a zigzag scanning mode, in this situation, the corresponding scanning order is zigzag scanning order. The zigzag scanning mode is a method for scanning matrix and is mostly used in encoding and decoding process of images and videos. FIG. 2 shows a schematic diagram of the scanning order of a typical 8×8 quantized coefficient block using a zigzag scanning mode. Refer to FIG. 2, according to an oblique zigzag scanning path, all quantized coefficients in the quantized block may be scanned sequentially with an initial position as the starting point, and a one-dimensional array of the quantized block may be obtained. It should be noted that the zigzag scanning mode remains the same between quantized blocks of different widths and heights, but the scanning order will be slightly different.

According to the above-mentioned specific scanning order, the scanning positions of the quantized coefficients in a quantized block may be initialized, that is, the subscripts of the quantized coefficients in the quantized block may be initialized after scanning, and the subscripts of the initialized quantized coefficients are marked as 0, 1, 2, 3, 4 and so on in turn. Wherein, the initial scanning position may be set to 0, and there is a one-to-one correspondence between the scanning positions POS and the positions of the quantized coefficients in the quantized block.

In some embodiments of the specification, the decoding of quantized coefficients based on a run-length decoding method is taken as an example. By decoding a run-length Run, which represents the number of consecutive zero coefficients that exist backward from the current scanning position POS, the scanning position of the next non-zero coefficient Level can be determined (there needs to decode a run-length Run before decoding a non-zero coefficient Level); and then by decoding the current non-zero coefficient Level, the value of the current non-zero coefficient Level can be obtained. After a run-length Run and a non-zero coefficient Level have been decoded, a quantized coefficient end flag can be decoded to indicate whether the non-zero coefficients in the current quantized coefficient block have been completely resolved, so as to avoid decoding a larger run-length Run. Each quantized coefficient end flag corresponds to a non-zero coefficient, thus in the process of decoding the quantized coefficients, when the current quantized coefficient end flag is decoded, the scan position POS of the non-zero coefficient corresponding to the current quantized coefficient end flag in the zigzag scan order can be obtained.

In step S120, configuring a first context model array, and using a fixed value as the base to calculate the logarithmic value of the value of the scanning position POS plus 1, and according to the logarithmic value, selecting a first context model from the first context model array; and using the first context model to encode or decode a binary symbol of the current quantized coefficient end flag.

In some embodiments of the specification, when configuring a first context model array, a largest quantized coefficient block may be defined, and the length of the first context model array can be determined according to the maximum value of the scanning position POS of the quantized coefficient block. For example: in the situation of setting the largest quantized coefficients block as 64×64, the block contains at most 4096 quantized coefficients, and the maximum subscript value of the non-zero coefficients may be 4095, that is, the maximum value of the scanning position POS may be 4095.

In some embodiments of the specification, a fixed value is used as the base to calculate the logarithm of the value obtained by adding 1 to the scanning position POS, wherein, the fixed value may be an integer greater than 1. For example: when the fixed value is 2, the logarithmic value may be calculated according to the following formula $n=\log_2(pos+1)$, wherein, n represents the logarithmic value, and pos represents the subscript of the non-zero coefficient.

In some embodiments of the specification, the step of selecting a first context model from the first context model array, comprises: rounding down the logarithmic value to obtain an index value, and selecting a first context model whose subscript is equal to the index value from the first context model array according to the index value; wherein, the index value may be represented by idx.

Further, when the scanning position POS of a non-zero coefficient is 4095, the non-zero coefficient is the last quantized coefficient, so there is no need to decode the quantized coefficient end flag of the non-zero coefficient, and only the case that the maximum scanning position POS is 4094 needs to be considered. In this case, an index value idx as 11 may be obtained by rounding down the logarithmic value of the value obtained by adding 1 to the scanning position POS, and the first context model array may contain 12 context models.

In some embodiments of the specification, according to the scanning position POS of a non-zero coefficient corresponding to current quantized coefficient end flag in a specific scanning order, the scanning position POS may be used as an input parameter to calculate the logarithmic value of the value obtained by adding 1 to the scanning position POS, and a context model may be selected from a first context model array according to the logarithm value. Different binary symbols may correspond to the same or different context models. For different quantized coefficient end flags, the scanning positions POS of the corresponding non-zero coefficients are also different. Therefore, different context models may be reasonably selected according to the scanning positions of the non-zero coefficients corresponding to different quantization coefficient end flags. According to the scheme of the present invention, context models can be selected efficiently, and the encoding and decoding efficiency of the quantized coefficient end flags can be improved, thereby the efficiency of video encoding and decoding can be further improved.

Figure 3:
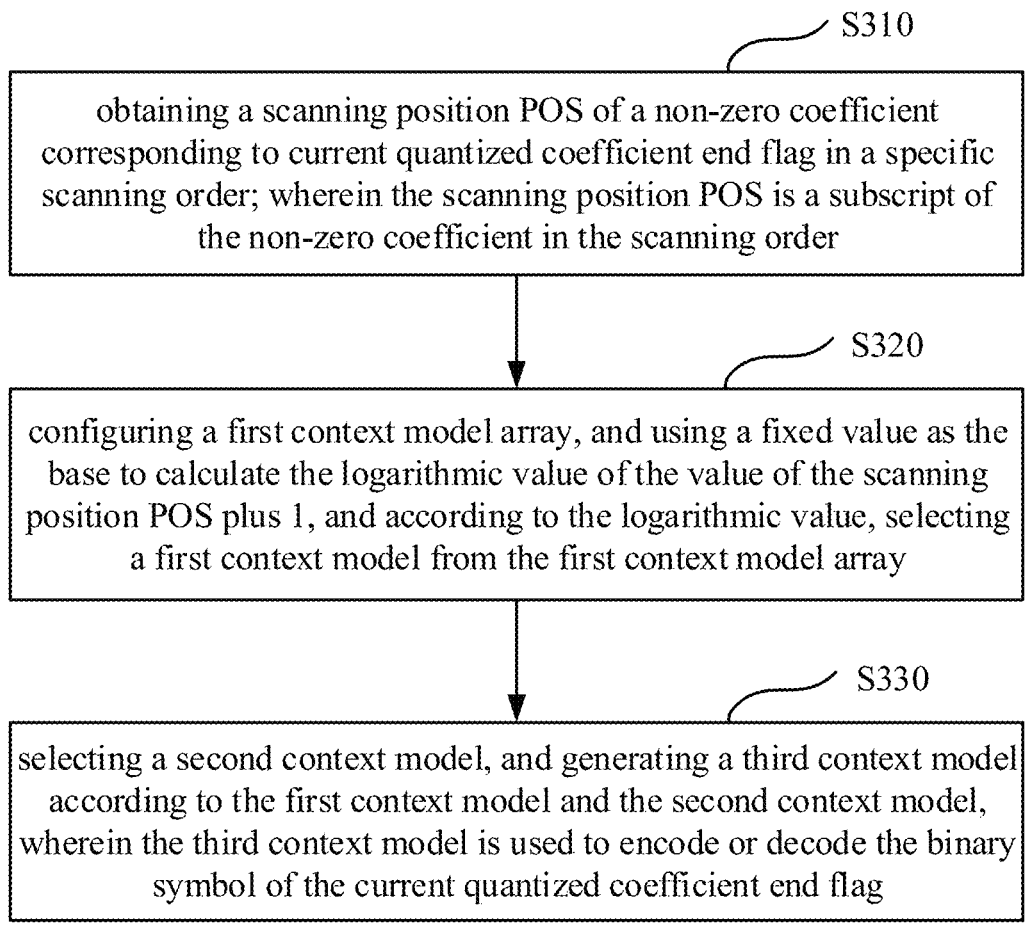
FIG. 3 is a schematic flowchart of another method for selecting a context model of a quantized coefficient end flag provided by an embodiment of the present invention.

FIG. 3 is a schematic flowchart of another method for selecting a context model of a quantized coefficient end flag provided by an embodiment of the present invention. The method may specifically include the following processes:

In step S310, obtaining a scanning position POS of a non-zero coefficient corresponding to current quantized coefficient end flag in a specific scanning order; wherein the scanning position POS is a subscript of the non-zero coefficient in the scanning order;

In step S320, configuring a first context model array, and using a fixed value as the base to calculate the logarithmic value of the value of the scanning position POS plus 1, and according to the logarithmic value, selecting a first context model from the first context model array;

In step S330, selecting a second context model, and generating a third context model according to the first context model and the second context model, wherein the third context model is used to encode or decode the binary symbol of the current quantized coefficient end flag.

Wherein, the processing procedures of steps S310-step S320 are basically the same as the above-mentioned steps S110-step S120, and will not be repeated here.

In some embodiments of the specification, the step of selecting a second context model may specifically include the following process:

Configuring a second context model array with an arbitrary length, and presetting a variable and a default value;

if current non-zero coefficient is the first non-zero coefficient in the scanning order, the value of the variable is equal to the default value;

if current non-zero coefficient is a non-zero coefficient after the first non-zero coefficient in the scanning order, the value of the variable is equal to the value of the previous non-zero coefficient of the current non-zero coefficient in the scanning order;

Correcting the value of the variable to the length value of the second context model array if the value of the variable is greater than the length value of the second context model array;

Subtracting 1 from the value of the variable to get an index value, and selecting a second context model whose subscript is equal to the index value from the second context model array according to the index value.

In some embodiments of the specification, the quantized coefficients are encoded or decoded in sequence according to a specific scanning order, therefore, by initializing scanning positions of the quantized coefficients, after each run-length Run is decoded, the scanning position of the current non-zero coefficient in the scanning order may be determined, and then, whether the current non-zero coefficient is the first non-zero coefficient in the scanning order may be determined, and the value of the previous non-zero coefficient of the current non-zero coefficient in the scanning order may be obtained.

In some embodiments of the specification, the arbitrary value and the default value may both be natural numbers greater than zero.

In step S330, further, denoting the more probable symbol of the first context model, the more probable symbol of the second context model and the more probable symbol of the third context model as mps1, mps2 and mps3, respectively; and denoting the negative logarithm value of mps1, the negative logarithm value of mps2 and the negative logarithm value of mps3 as lgPmps1, lgPmps2 and lgPmps3, respectively.

Then, the step of generating a third context model according to the first context model and the second context mode, may specifically include the following process:

When mps1 and mps2 are the same, then mps3 is equal to mps1, in this situation, $$lgPmps3=(lgPmps1+lgPmps2)\gg 1;$$

When mps1 and mps2 are different, and lgPmps1 is less than lgPmps2, then mps3 is equal to mps1, in this situation, $$lgPmps3=(1023-((lgPmps-lgPmps1)\gg 1));$$

When mps1 and mps2 are different, and lgPmps1 is greater than lgPmps2, then mps3 is equal to mps2, in this situation, $$lgPmps3=(1023-((lgPmps-lgPmps2)\gg 1)).$$

The embodiments of the specification also provide a video encoding method, comprising:

Obtaining a predicted image block through prediction technologies according to prediction information;

Transform units subtracts the predicted image block from a corresponding original image block to obtain a first residual image block;

The first residual image block is transformed and quantized to obtain a quantized block;

Writing division information, the prediction information and the quantized block into a bitstream;

Performing inverse quantization and inverse transformation on the quantized block to obtain a second residual image block;

Generating a reconstructed image block based on the second residual image block and the predicted image block;

Performing deblocking filtering on the reconstructed image formed by reconstructed image blocks to obtain a reference image for reference in subsequent frames;

The video encoding method further comprises, in the process of writing the quantized block into the bitstream during video encoding, the above method may be used to select a context model of a quantized coefficient end flag in the quantized block.

Specifically, in a specific application scenario, in a video encoding process, a image block composed of predicted pixels obtained by prediction technologies may be called a predicted image block; when encoding a frame of image, the image may be divided into coding units of different sizes for encoding; a coding unit may be divided into one or more prediction units; a coding unit may be divided into one or more transform units; in the coding units, intra or inter prediction mode may be used to predict and obtain predicted image blocks corresponding to the prediction units; the original image block corresponding to the transform unit subtracts the corresponding predicted image block to obtain residual image blocks Resi; the residual image blocks Resi undergoes transformation and quantization operations to obtain quantized blocks; write division information, prediction modes and the quantized blocks, etc. of the prediction units and the transform units into a bitstream through entropy coding; in the process of entropy encoding, a context model may be selected for a quantized coefficient end flag in the quantized block according to the method described in the embodiment of the specification; the quantized blocks may be inversely quantized to obtain inverse transform blocks; the inverse transform blocks may be inversely transformed to obtain residual image blocks Resi', and a residual image block Resi' and a corresponding predicted image block may be added to obtain a reconstructed image block; a reconstructed image composed of the reconstructed image blocks may be loop-filtered and provided for reference in subsequent frames.

The embodiments of the specification also provide a video decoding method, comprising:

Decoding division information, prediction information and quantized blocks from a bitstream;

Obtaining a predicted image block through prediction technologies according to the prediction information;

Performing inverse quantization and inverse transformation on the quantized block to obtain a residual image block;

Adding the residual image block to the corresponding predicted image block to obtain a reconstructed image block;

Performing deblocking filtering on the reconstructed image formed by reconstructed image blocks to obtain a reference image for reference in subsequent frames;

The video decoding method further comprises, in the process of decoding the quantized block from the bitstream during video decoding, the above method may be used to select a context model of a quantized coefficient end flag in the quantized block.

Specifically, in a specific application scenario, in a video decoding process, a bitstream may be parsed to obtain prediction modes, reference frame indexes, motion vectors, quantized blocks and other information of each coding unit. In the process of entropy decoding, a context model may be selected for a quantized coefficient end flag in the quantized block according to the method described in the embodiment of the specification. According to the prediction modes, the reference frame indexes, the motion vectors and other information, predicted image blocks PRED may be generated. Perform inverse quantization and inverse transformation operations on the quantized blocks to obtain residual image blocks RESI'. A residual image block RESI' may be added to corresponding predicted image block PRED to obtain a reconstructed image block RECO. A reconstructed image formed by the reconstructed image blocks may be subjected to deblocking filtering to obtain a reference image for reference in subsequent frames.

Figure 4:
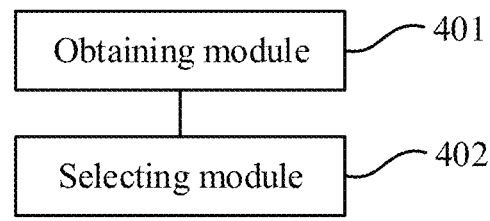
FIG. 4 is a schematic structural diagram of an apparatus for selecting a context model of a quantized coefficient end flag provided by an embodiment of the present invention.

Based on the same idea, the embodiments of the specification also provide an apparatus for selecting a context model of a quantized coefficient end flag. As in FIG. 4, it shows an apparatus for selecting a context model of a quantized coefficient end flag provided by some embodiments of the specification, which including a processor, configured to execute the following program modules stored in a memory:

Obtaining module 401, for obtaining a scanning position POS of a non-zero coefficient corresponding to current quantized coefficient end flag in a specific scanning order; wherein the scanning position POS is a subscript of the non-zero coefficient in the scanning order;

Selecting module 402, for configuring a first context model array, and using a fixed value as the base to calculate the logarithmic value of the value of the scanning position POS plus 1, and according to the logarithmic value, selecting a first context model from the first context model array; using the first context model as the context model for encoding or decoding a binary symbol of the current quantized coefficient end flag.

Figure 5:
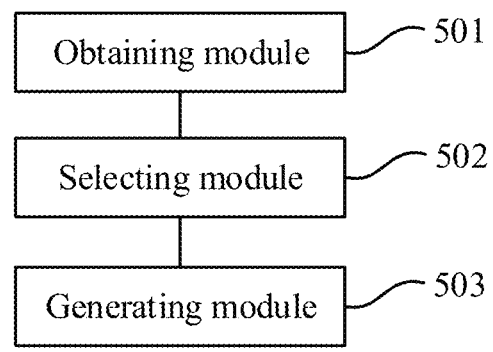
FIG. 5 is a schematic structural diagram of another apparatus for selecting a context model of a quantized coefficient end flag provided by an embodiment of the present invention.

The embodiments of the specification also provide an apparatus for selecting a context model of a quantized coefficient end flag. As in FIG. 5, it shows an apparatus for selecting a context model of a quantized coefficient end flag provided by some embodiments of the specification, which including:

Obtaining module 501, for obtaining a scanning position POS of a non-zero coefficient corresponding to current quantized coefficient end flag in a specific scanning order; wherein the scanning position POS is a subscript of the non-zero coefficient in the scanning order;

Selecting module 502, for configuring a first context model array, and using a fixed value as the base to calculate the logarithmic value of the value of the scanning position POS plus 1, and according to the logarithmic value, selecting a first context model from the first context model array;

Generating module 503, for selecting a second context model, and generating a third context model according to the first context model and the second context model, wherein the third context model is used to encode or decode the binary symbol of the current quantized coefficient end flag.

The embodiments of the specification also provide an electronic device, comprising a memory, a processor, and a computer program stored on the memory and capable of running on the processor, wherein, the processor may implement the above-mentioned method for selecting a context model of a quantized coefficient end flag when the program is executed.

The specific embodiments of the specification have been described above. Other embodiments are within the scope of the appended claims. In some cases, the actions or steps recited in the claims may be performed in a different order than in the embodiments and may still achieve desired results. In addition, the processes depicted in the figures are not necessarily required to achieve the desired results only in the particular order as shown. In some embodiments, multitasking and parallel processing are also possible or may be advantageous.

The various embodiments in the specification are described in a progressive manner, and the same similar parts between the various embodiments may be referred to each other, and each embodiment focuses on the differences from the other embodiments. In particular, as for the embodiments of the apparatus and the electronic device, since they are basically similar to the method embodiment, the descriptions thereof are relatively simple, and the relevant parts may be referred to the description of the method embodiment.

The apparatus, the electronic device and the method provided by the embodiments of the specification are corresponding, and therefore, the apparatus and the electronic device also have similar beneficial technical effects as the corresponding methods. Since the beneficial technical effects of the method have been described in detail above, the beneficial technical effects of the corresponding apparatus and the electronic device will not be described herein.

The present description is described in terms of flowcharts and/or block diagrams of a methods, devices (systems), and computer program products according to embodiments of the specification. It should be understood that each flow and/or block of the flowcharts and/or block diagrams, and combinations of flows and/or blocks in the flowcharts and/or block diagrams may be implemented by computer program instructions. These computer program instructions may be provided to a processor of a general purpose computer, a special purpose computer, an embedded processor, or other programmable data processing device to produce a machine, and thus, instructions executed by a processor of a computer or other programmable data processing device generate devices for implementing the functions specified in one flow or more flows of the flowcharts or one block or more blocks of the block diagrams.

It should also be noted that the terms "comprise" or "include" or any other variations thereof are intended to encompass a non-exclusive inclusion, lead to a process, a method, a commodity, or a device including a series of elements includes not only those elements but also other elements not explicitly listed, or inherent in the process, the method, the commodity, or the device. Without more restrictions, elements defined by the phrase "include/comprise a . . . " do not exclude the presence of additional identical elements in the process, the method, the commodity, or the device including the elements.

This description may be described in the general context of computer-executable instructions executed by a computer, such as a program module. Generally, program modules include routines, programs, objects, components, data structures, and the like that perform particular tasks or implement particular abstract data types. It is also possible to implement the specification in a distributed computing environment in which tasks are performed by remote processing devices that are connected through a communication network.

The foregoing description of the disclosed embodiments enables those skilled in the art to implement or use the present invention. Various modifications to these embodiments will be obvious to those skilled in the art, and the general principles defined herein can be implemented in other embodiments without departing from the spirit and scope of the present invention. Therefore, the present invention will not be limited to the embodiments shown in this document, but should conform to the widest scope consistent with the principles and novel features disclosed in this document.

We claim:

1. A method for selecting a context model of a quantized coefficient end flag, comprising:
    obtaining a scanning position POS of a non-zero coefficient corresponding to current quantized coefficient end flag in a specific scanning order; wherein the scanning position POS is a subscript of the non-zero coefficient in the scanning order;
    configuring a first context model array, and using a fixed value as the base to calculate the logarithmic value of the value of the scanning position POS plus 1, and according to the logarithmic value, selecting a first context model from the first context model array; and using the first context model to encode or decode a binary symbol of the current quantized coefficient end flag.

2. The method of claim 1, wherein, the scanning order is a zigzag scanning order.

3. The method of claim 1, wherein, the fixed value is an integer greater than one.

4. The method of claim 1, wherein, the step of selecting a first context model from the first context model array, comprising:
    rounding down the logarithmic value to obtain an index value, and selecting a first context model whose subscript is equal to the index value from the first context model array according to the index value.

5. The method of claim 1, wherein, further comprising:
    selecting a second context model, and generating a third context model according to the first context model and the second context model, wherein the third context model is used to encode or decode the binary symbol of the current quantized coefficient end flag.

6. The method of claim 5, wherein, the step of selecting a second context model, comprising:

configuring a second context model array with an arbitrary length, and presetting a variable and a default value;
if current non-zero coefficient is the first non-zero coefficient in the scanning order, the value of the variable is equal to the default value;
if current non-zero coefficient is a non-zero coefficient after the first non-zero coefficient in the scanning order, the value of the variable is equal to the value of the previous non-zero coefficient of the current non-zero coefficient in the scanning order;
correcting the value of the variable to the length value of the second context model array if the value of the variable is greater than the length value of the second context model array;
subtracting 1 from the value of the variable to get an index value, and selecting a second context model whose subscript is equal to the index value from the second context model array according to the index value.

7. The method of claim 6, wherein, further comprising:
denoting the more probable symbol of the first context model, the more probable symbol of the second context model and the more probable symbol of the third context model as mps1, mps2 and mps3, respectively;
denoting the negative logarithm value of mps1, the negative logarithm value of mps2 and the negative logarithm value of mps3 as lgPmps1, lgPmps2 and lgPmps3, respectively.

8. The method of claim 7, wherein, the step of generating a third context model according to the first context model and the second context model, comprising:
when mps1 and mps2 are the same, then mps3 is equal to mps1, in this situation, $$lgPmps3=(lgPmps1+lgPmps2)\text{>>}1;$$

when mps1 and mps2 are different, and lgPmps1 is less than lgPmps2, then mps3 is equal to mps1, in this situation, $$lgPmps3=(1023-((lgPmps2-lgPmps1)\text{>>}1));$$

when mps1 and mps2 are different, and lgPmps1 is greater than lgPmps2, then mps3 is equal to mps2, in this situation, $$lgPmps3=(1023-((lgPmps1-lgPmps2)\text{>>}1)).$$

9. A video encoding method, comprising:
obtaining a predicted image block through prediction technologies according to prediction information;
transform units subtracts the predicted image block from a corresponding original image block to obtain a first residual image block;
the first residual image block is transformed and quantized to obtain a quantized block;
writing division information, the prediction information and the quantized block into a bitstream;
performing inverse quantization and inverse transformation on the quantized block to obtain a second residual image block;
generating a reconstructed image block based on the second residual image block and the predicted image block;
performing deblocking filtering on the reconstructed image formed by reconstructed image blocks to obtain a reference image for reference in subsequent frames;
wherein, in the process of writing the quantized block into the bitstream during video encoding, the method according to claim 1 is used for selecting a context model of a quantized coefficient end flag in the quantized block.

10. A video decoding method, comprising:

decoding division information, prediction information and quantized blocks from a bitstream;

obtaining a predicted image block through prediction technologies according to the prediction information;

performing inverse quantization and inverse transformation on the quantized block to obtain a residual image block;

adding the residual image block to the corresponding predicted image block to obtain a reconstructed image block;

performing deblocking filtering on the reconstructed image formed by reconstructed image blocks to obtain a reference image for reference in subsequent frames;

wherein, in the process of decoding the quantized block from the bitstream during video decoding, the method according to claim 1 is used for selecting a context model of a quantized coefficient end flag in the quantized block.

11. An apparatus for selecting a context model of a quantized coefficient end flag, comprising a processor, configured to execute the following program modules stored in a memory:

obtaining module, for obtaining a scanning position POS of a non-zero coefficient corresponding to current quantized coefficient end flag in a specific scanning order; wherein the scanning position POS is a subscript of the non-zero coefficient in the scanning order;

selecting module, for configuring a first context model array, and using a fixed value as the base to calculate the logarithmic value of the value of the scanning position POS plus 1, and according to the logarithmic value, selecting a first context model from the first context model array; using the first context model as the context model for encoding or decoding a binary symbol of the current quantized coefficient end flag.

12. The apparatus of claim 11, wherein, further comprising:

generating module, for selecting a second context model, and generating a third context model according to the first context model and the second context model, wherein the third context model is used to encode or decode the binary symbol of the current quantized coefficient end flag.

13. An electronic device, comprising a memory, a processor, and a computer program stored on the memory and capable of running on the processor, wherein, the computer program can be executed by the processor to perform the method of claim 1.

* * * * *